July 14, 1953 P. FARKAS 2,645,311
BRAKE FOR VEHICLES AND OTHER USES
Filed May 27, 1946 3 Sheets-Sheet 1
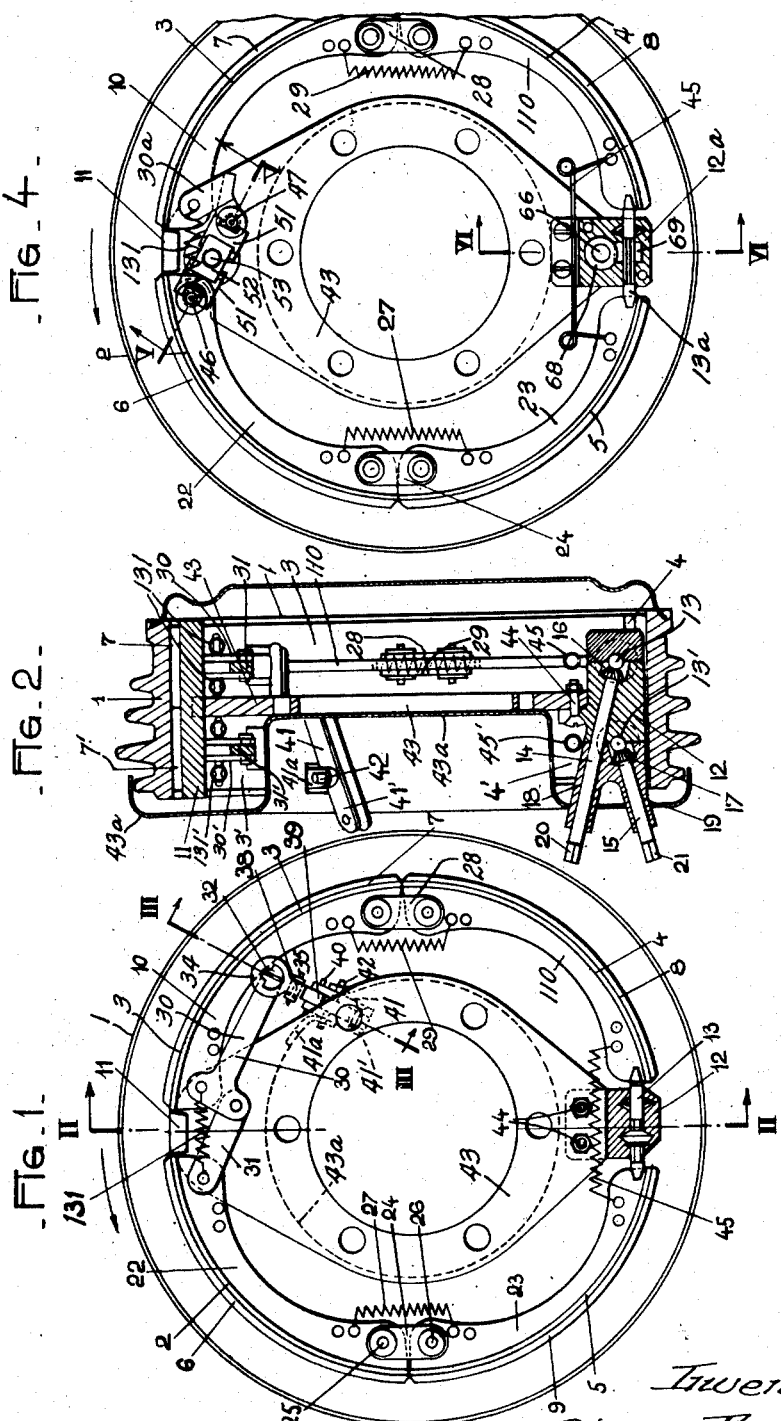

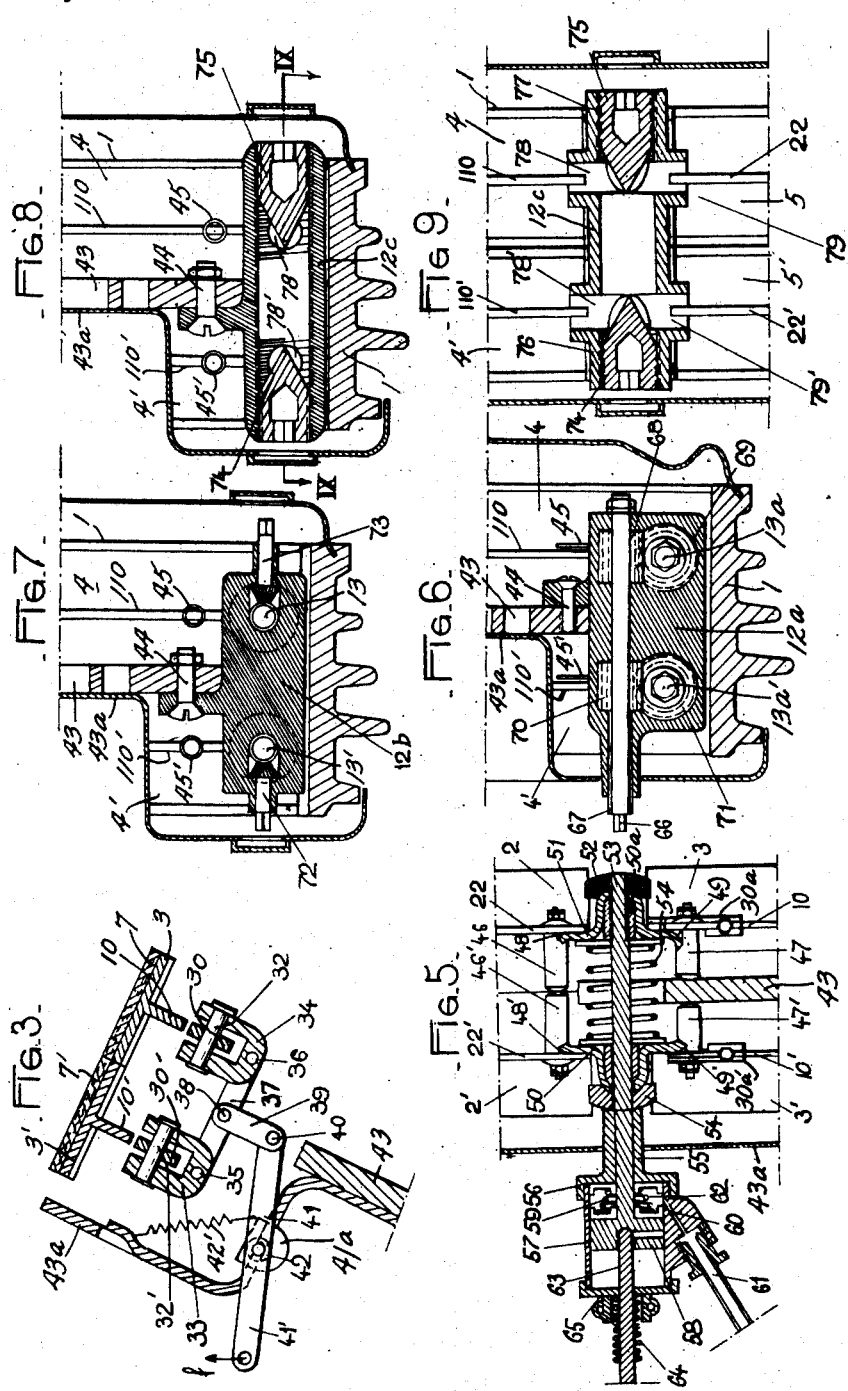

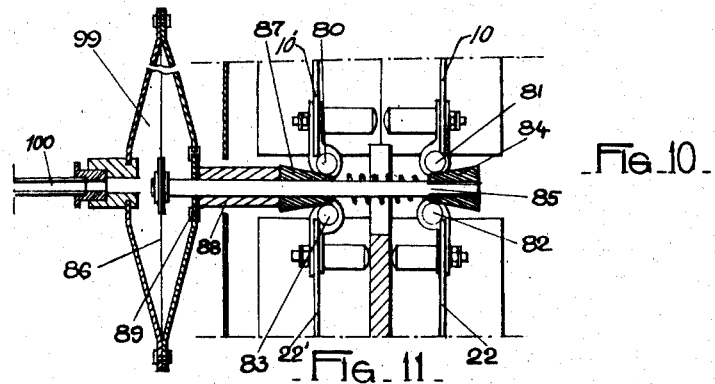
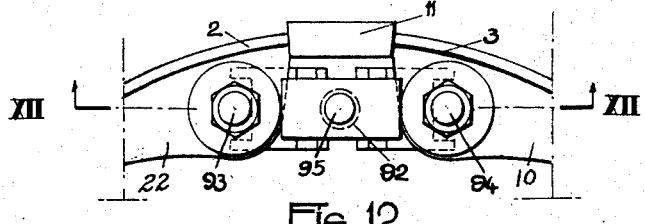
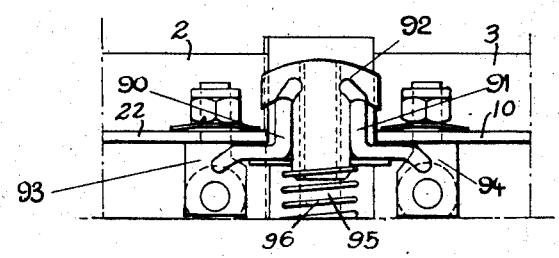
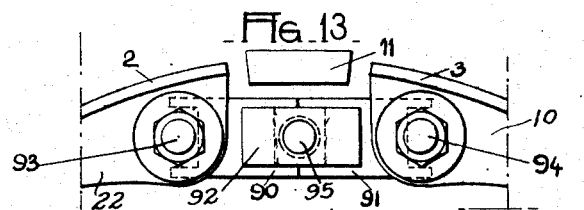
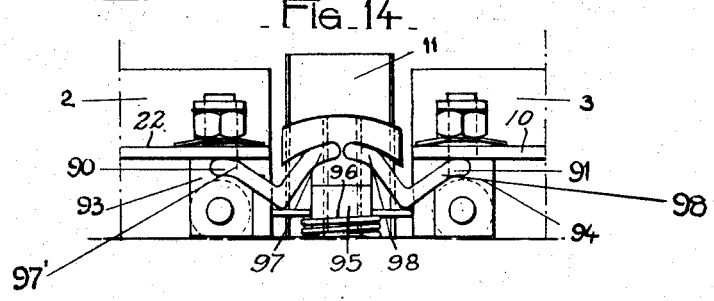

Patented July 14, 1953

2,645,311

UNITED STATES PATENT OFFICE 2,645,311

BRAKE FOR VEHICLES AND OTHER USES

Pierre Farkas, Paris, France

Application May 27, 1946, Serial No. 672,517
In France August 2, 1945

9 Claims. (Cl. 188—79)

This invention relates to brakes for vehicles and other similar uses and more particularly to drum brakes comprising segmental shoes having a large width of braking contact between the shoes and the drum and more particularly to such brakes having twin sets of shoes.

It is an object of the invention to provide in such brake a control device which acts positively to apply the sets of shoes with an adequate power without substantial manual effort.

Another object of the invention is to provide a juxtaposed individual adjusting device for each set of shoes, with the operating members for said devices being unitarily disposed and accessibly located.

A further object of the invention is to provide in brakes of the type described, sets of shoes comprising each a number of pairs of short shoes in which the two shoes of each pair are connected by a pivotal device having resilient members which frictionally maintains said pairs of shoes in a self-adjusted relation.

It is still another object of the invention to provide, in a brake having twin sets of brake shoes, a single operating means for actuating all of said sets of shoes and an individual adjusting means for each shoe of said sets.

According to the invention, a brake for vehicles and similar uses comprises at least two juxtaposed sets of segmental shoes arranged in a drum, which is provided with a single actuating device acting on said sets of shoes and with one adjusting device for each of the sets of shoes, this arrangement enabling to adjust each set of shoes bearing on a small width of the inner surface of the drum and making sure that all the shoes bear with accuracy with a substantially uniform pressure on said surface when applied. In the preferred form of the invention, each set of shoes is connected with a control toggle and all of the toggles are connected with each other by a rocking lever, in the case of twin brakes, which is connected with and actuated by the control gear.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout and in which:

Fig. 1 is a side view in elevation of a preferred form of brake, in accordance with the present invention.

Fig. 2 is a cross-sectional view taken along line II—II of Fig. 1.

Fig. 3 is a cross-sectional view taken along line III—III of Fig. 1.

Fig. 4 is a side view in elevation showing a modification.

Fig. 5 is a cross-sectional view taken along line V—V of Fig. 4.

Fig. 6 is a cross-sectional view taken along line VI—VI of Fig. 4.

Figs. 7 and 8 are a cross-sectional view similar to Fig. 6 but showing modifications thereof.

Fig. 9 is a cross-sectional view taken along line IX—IX of Fig. 8.

Fig. 10 is a cross-sectional view of modified form of control device.

Fig. 11 is a fragmentary side view in elevation showing a modified form of control device.

Fig. 12 is a fragmentary cross-sectional view taken along line XII—XII of Fig. 11 and showing only half of the brake with the control device on only one set of the twin set of shoes; and Figs. 13 and 14 are views similar to Figs. 11 and 12, respectively, illustrating the actuation of the control device and with the shoes in the spaced position.

Referring now to the drawings, specifically to Fig. 1, a brake, according to the present invention, may have twin sets of shoes mounted therein. Each of the sets of shoes is composed of four segments 2, 5, 3 and 4 and 2', 5', 3', and 4' respectively. These shoe segments are provided with the usual brake linings 6, 7, 8 and 9, 6', 7', 8', and 9', respectively and have inwardly extending webs 22, 10, 110 and 23 and 22', 10', 110', and 23', respectively. These shoes are mounted in twin sets on opposite sides of a fixed plate 43 which is positioned centrally of a brake drum 1, as shown in Figures 2, 3 and 5, the segments being juxtaposed in pairs 2 and 2', 5 and 5', 3 and 3' and 4 and 4', the elements of the twin-set being identical to the set shown in Figure 1.

This brake is of the type wherein both pairs of upper segments 2, 2' and 3, 3' of the twin sets of shoes bear freely against a stop 11 fixed on the plate 43 within the drum 1 and both pairs of lower segments 5, 5' and 4, 4' are connected by two adjustment devices, respectively. The adjustment devices comprise a housing or block 12 which is fixed to the plate 43 by bolts 44 and in which are adjustable studs 13 and 13' of well known type and respectively interposed between the segments 4, 5 and 4', 5'. The adjustable studs 13, 13' are adjusted by means of bevel gears respectively in mesh with bevel pinions 16 and 17 carried by actuating rods 14 and 15 journalled in bores 18 and 19 in the block 12 and having squares or other key elements 20 and 21 on their outer ends. The rods 14 and 15 are disposed obliquely relative to each other. Springs 45, 45' extend between the webs 23, 110 and 23', 110' respectively and bias the sets of shoe segments toward each other.

The segments 2 and 5 have their webs 22 and 23 connected by a compensating means comprising a connecting link 24 which is pivotally secured to said webs by bolts 25 and 26, respectively. Resilient washers are seated on the bolts 25 and 26 to frictionally engage and retain the webs 22 and 23 in adjusted angular relationship with the link 24. A compensating spring 27 biases the webs toward one another. The webs 10 and 110 of the segments 3 and 4 are also connected by a compensating means or link 28 with similar bolts and resilient washers and a similar compensating spring 29 which likewise biases said webs and segments toward each other.

Moreover, the webs 22 and 10 of the segments 2 and 3 are connected by a spacing toggle, best shown in Figs. 1 and 3, comprising an angle lever 30 and a link 31, each pivotally connected to one of said webs and both of which straddle said webs and are pivotally connected to each other at their adjacent inner ends in offset position or relation to simultaneously draw all of said pair of sets of webs and shoes toward each other or against and limited by fixed stop 11 or to separate and expand the shoes into braking engagement or action against the inner side of the drum. A spring 131 is connected to the adjacent ends of said segments and bias the segment ends against the fixed stop 11 mounted on the plate 43. A similar toggle and spring arrangement connects the webs of the parallel segments 2' and 3'. The articulation axes 32 and 32' of the pair of angle levers 30, 30' are supported in caps or straps 33 and 34 which are connected by pivots 35 and 36 to a rocking lever 37 that is pivotally secured mid-way of its ends by a pivot 38 to a link 39 that, in turn, is secured by a pivot 40 to a beam 41 that is swiveled on a pivot 42 carried by a bracket 41a on the backing plate 43a of the brake. A spring 42' is connected to the beam 41 and anchored to the backing plate 43a and biases the beam to relax the brake shoes. The free end 41' of the beam 41 is connected with a control member to be pulled in the direction of the arrow f against spring 42' for operating the brake.

In view of the preceding description, it is obvious that the four segments 2, 3, 4, 5 can be adjusted with precision by means of the adjusting device actuated by the rod 14 and that the four adjacent segments 2', 3', 4' and 5' can be adjusted by means of the rod 15. On the other hand, the whole unit, formed of the eight segments, is controlled for braking by the single control member connected with the beam 41 at 41' due to the fact that the rocking lever 37 simultaneously draws on the toggles 30—31 of the twin sets of shoes. Thus, the adjustment can be effected with precision on the reduced width of the braking surface controlled by each shoe of four segments, while the control is effected simultaneously on the whole of said braking surface.

Figs. 4 to 6 show a similar brake provided with another type of control device and a modified adjusting device. The webs 22 and 22' of the segments 2 and 2' are provided with pins or fingers 46 and 46' respectively, and the toggle levers 30a and 30a', pivoted to the webs 10 and 10' of the segments 3 and 3', are provided with pins or fingers 47 and 47' respectively. The pins or fingers 46 and 46' and 47 and 47' are provided with notches 48 and 48' and 49 and 49' respectively, within which the ends of two sets 50 and 51 of angle or bent-levers are seated over bearing parts or sleeves 53a and held separated or expanded by a spring 54a with interposed washers at its ends. The outer ends of the levers 51 are covered by a cap 52 threaded on a rod 53 which extends through a cap 54 covering the outer ends of the levers 50. The outer surface of the cap 54 bears against the end of a sleeve 55 which terminates in a cup 56 forming the bottom of a cylinder 57. A piston 58 is slidable in the cylinder 57 and is fast with the rod 53. A spring 59, within the chamber 62 of the cylinder 57, biases the piston 58 outwardly. A channel 60, connected with a liquid supply conduit 61, opens into the chamber 62 located behind the piston 58. In addition, the end of a cable 63 is secured to the piston 58, and is surrounded by a sheath 64 which bears against and is secured to the outer end 65 of the cylinder 57.

To apply the brake incorporating this modification, a pull upon the cable 63 moves the piston 58 and rod 53 and thus draws the cap 52 against the bent levers 51. Through the reaction of the sheath 64 against the cylinder 57, the sleeve 55 is pressed against the cap 54 on the bent levers 50. Thus, both said pairs of bent levers 50 and 51 push the pins 46, 46' and 47, 47' respectively fixed with the segments and therefore, expand the shoes for braking action.

The control can also be effected through hydraulic means by directing liquid under pressure through the conduit 61 and the channel 60 into the chamber 62 where said liquid acts, on the one hand, against the piston 58 which thus draws the cap 52 against the bent levers 51 and, on the other hand, against the bottom 56 of the cylinder which pushes the cap 54 and the bent levers 50. Thus, both pairs of shoes are actuated simultaneously.

The modified adjusting device, as shown in Fig. 6, comprises a block 12a, as in Figs. 1 and 2, and, while the device comprises the same basic elements, it differs in that the control shafts 66 and 67 are concentric. The shaft 66 carries a worm 68 driving a worm-gear 69 actuating the adjusting stud 13a engaging the segments 4 and 5 while the shaft 67 comprises a sleeve surrounding the shaft 66 and carrying a worm 70 driving a worm-gear 71 actuating the adjusting stud 13a' engaging the segments 4' and 5'.

Another modification of an adjusting device employing the adjustable studs 13 and 13' is shown in Fig. 7 wherein the two actuating shafts 72 and 73 project outwardly on each side of the block 12b, each drivingly engaging by means of bevel pinions with the bevel gears of the adjusting studs 13 and 13' respectively.

According to the modifications shown in Figs. 8 and 9, the adjustment is effected by means of wedges 74 and 75 screwed into internally threaded sleeves 76 and 77 in a tubular block 12c and bear against sloping cam surfaces on members 78 and 79 which respectively abut the webs 10 and 23', 110' and 23, 110, respectively, of the shoe segments. The wedges 74 and 75 are provided with square or polygonal sockets or with a slot to permit their actuation by means of a key or any other tool.

The modification shown in Fig. 10 comprises rollers 80 and 81, and 82 and 83 journalled on to the ends of the webs 10 and 10' and 22 and 22' of the segments and which bear against two wedges 84 and 87. One of the wedges 84 is fast with a rod 85 that is fastened to a diaphragm 86, while the other of the wedges 87 is fast with a sleeve 88 fastened to the bottom 89 of a bellows containing the diaphragm 86. The chamber 99 of the bellows, on the side of the diaphragm opposed to that facing the bottom 89, is in communication with a conduit 100 receiving, for instance, the partial vacuum of an engine. Upon evacuation, or partial evacuation, of the chamber 99, the diaphragm 86 is drawn outwardly and this pulling effect is transmitted by the rod 85 to the wedge 84 which acts upon the rollers 81 and 82 to expand the brake shoes. Simultaneously, the bottom 89 of the bellows acts through reaction upon the sleeve 88 and the wedge 87 which separate the rollers 80 and 83 and thereby expand their brake shoes.

The modification of the control device shown in Figs. 11 to 14, is similar to the device of Figs. 4 and 5 with the difference that it directly bears against the segments while the device of Figs. 4 and 5 acts, through the medium of a toggle, obliquely with respect to the radius of the brake. It will be noted that Figures 12 and 14 show only half the brake with only one of the twin sets of shoes but it will be understood that the apparatus is duplicated as shown in Figure 5. In this modification, bent levers 90 and 91 engage a cap 92 at their adjacent ends and have their other ends seated in notches provided in two members 93 and 94 fast with the segments. A rod 95 is connected at one end with the cap 92 and at the other end to a control member (not shown). A spring 96 tends to maintain the pieces in the position shown in Figs. 11 and 12. When the rod 95 and the cap 92 are pulled, both levers 90 and 91 turn upon their bearings 97, 98, and 97' and 98' respectively, to assume the position shown in Figs. 13 and 14. In the course of this turning movement, said levers push back the members 93, 94 and, with them, the segments 2 and 3 which are thus expanded and pressed against the drum.

The adjustment devices of Figs. 1, 2, 3, 4, 6 and 7 are more particularly adapted for self-applying brakes, while those of Figs. 8 and 9 as well as the control device of Figs. 11 to 14 are more particularly adapted for non-self-applying brakes. Although the disclosure comprises juxtaposed pairs of shoes, it is obvious that it would also be possible to arrange side by side three or more sets of shoes and to provide said each set of shoes with independent adjusting members while having a single control device for actuating all of the shoes simultaneously and in a balanced manner.

Although a certain specific embodiment of the invention has been shown and described, it is obvious that many modifications thereof are possible. The invention, therefore, is not to be restricted except insofar as is necessitated by the prior art and by the spirit of the appended claims.

Having thus described my invention, what I claim and desire to secure by Letters Patent is:

1. A brake comprising a fixed part, a drum for connection to a rotating member, two sets of juxtaposed brake shoes of four segmental arcuate quarter sections each, each set comprising two diametrically opposed radially aligned separate pairs of such sections pivotally connected by links with their adjacent aligned upper and lower ends spaced apart and limited in their movements toward each other, spring means independently biasing the adjacent upper and lower ends of the pairs of each shoe toward each other, means carried by said fixed part and between the corresponding spaced aligned lower ends of each pair of shoes to individually adjust said ends of each pair into expanded or contracted positions relative to the drum, and a single actuating means also carried by said fixed part and between and common to the corresponding adjacent upper ends of all of said pairs of both sets of shoes for simultaneously expanding or contracting all of said pairs and both sets of shoes relative to the drum independently of said adjusting means to simultaneously apply or release all of said shoes to or from the drum respectively.

2. A brake as defined in claim 1 wherein said actuating means comprises notched fingers carried by said webs near their adjacent ends, a pair of angular levers for each shoe and disposed with one corresponding pair of their legs substantially parallel and the remaining corresponding pair of their legs extending in opposite directions respectively, a cap for each pair of levers, said levers being mounted with the ends of said oppositely extending legs engaged in the notches of said fingers respectively and the ends of their parallel legs jointly engaged in the respective cap, one of said caps having a bore therethrough, the other of said caps being secured to a rod extending through the bore of said first-mentioned cap, a sleeve on said rod and bearing against said first-mentioned cap, a cylinder on said sleeve, a piston in said cylinder and being fast with said rod, a spring interposed between the two pairs of angle levers, a cable secured to said piston, a sheath around said cable and resting against the cylinder, a pipe supplying a fluid under pressure, and a channel connecting said pipe to the chamber of the cylinder behind said piston.

3. A brake as defined in claim 1 wherein said actuating means comprises rollers mounted on the ends of said webs, a bellows containing a diaphragm and having an aperture in one side, a sleeve fixed to said side and concentric with said aperture, a rod mounted in said sleeve and connected with said diaphragm, a wedge fast with said rod, a second wedge fast with said sleeve, and a conduit connected to said bellows on the side opposite the apertured side.

4. A brake comprising a drum having a braking surface, two sets of shoes juxtaposed across the width of the braking surface of said drum, each of said shoes having a web, notched pieces carried by said webs, a pair of angle levers for each shoe and disposed with one corresponding pair of their legs substantially parallel and the remaining corresponding pair of their legs extending in opposite directions respectively, a cap for each pair of levers, said levers being mounted with their oppositely extending ends engaged in the notches of said pieces and their other ends engaged in said cap, and control means operatively connected with said caps.

5. A brake comprising a fixed part, a drum for connection to a rotating member, two sets of juxtaposed brake shoes of four segmental arcuate quarter sections each, each set comprising two diametrically opposed radially aligned separate pairs of such sections pivotally connected by links with their adjacent aligned upper and lower ends spaced apart and limited in their movements toward each other, means carried by said fixed part and between the corresponding spaced aligned lower ends of each pair of shoes to individually adjust said ends of each pair into expanded or contracted positions relative to the drum, a pair of toggle members connecting the adjacent upper ends of each pair of shoes, each toggle member comprising a T-shaped angle lever pivoted to laterally aligned corresponding upper ends of the upper sections of one pair of shoes of each set and each lever having an offset extending diagonally inwardly from the pivot thereof, a link pivoted at one end to the adjacent upper ends of the upper sections of the other pair of shoes of each set radially aligned with and spaced from the upper ends of the upper sections to which the angle levers are pivoted, said link being pivoted at its other end to the free inner end of the offset of each angle lever and extending angularly in the same direction and substantially parallel to said angle lever, a U-shaped member having its legs straddling and pivoted to the free end of each angle lever, a rectilinear rocking lever pivoted at its opposite ends to the bights of the U-shaped members, a second link pivoted at one end to the rocking lever intermediately thereof and a rectilinear beam pivoted at one end to the other end of the second link and fulcrumed intermediately to said fixed part and resiliently held outwardly at its link attached end to move the rocking lever and outer ends of the pair of angle levers outwardly to normally draw the adjacent radially aligned ends of the opposed pairs of sections toward each other to contract and disengage all of the sections of both sets of shoes, the other end of the beam being connected to an actuating control member to swing the beam on its fulcrum in the opposite direction against said resiliently to pull the ends of the angle levers pivoted to the U-shaped members inwardly tending to straighten out both toggles and move said spaced upper ends of the upper sections of the opposed pairs of sections of both sets of shoes further away from each other in expanded brake-applying positions.

6. A brake, comprising a drum, two sets of juxtaposed sets of arcuate shoes with inwardly extending webs, each set composed of two opposed pairs of shoes with articulate connections between adjacent ends of the shoes of each pair and the other adjacent ends of the respective pairs of shoes spaced apart, all of said adjacent pairs of ends being resiliently biased toward each other, a fixed stop between diametrically opposite spaced-apart ends to limit the movement of said ends toward each other, means for individually adjusting and expanding corresponding spaced-apart ends of the pairs of shoes at one side of the drum, individual articulated connections between and positively connecting the other corresponding spaced-apart ends of the pairs of shoes at the other side of the drum diametrically opposite the first-mentioned spaced-apart ends, and lever operated means pivotally connected in balanced positions to both of said articulated connections to simultaneously actuate said connections to apply all of the shoes to the drum in unison with uniform braking pressure.

7. A brake comprising a drum, two sets of four shoes in radially extending aligned opposed pairs, said sets being in spaced parallel relation to each other, a control toggle including a link and a crank lever interposed between the ends of the opposed pairs of the shoes of each set, a U-shaped connection pivoted to and straddling the free ends of the crank levers, a rocking lever having its opposite ends pivotally connected to the intermediate portions of the U-shaped connections, a link connecting the middle of said rocking lever to an end of a beam swivelled on a fixed pin and connected at its other end to a control member for simultaneously applying all of the opposed pairs of both sets of shoes to the drum with uniform pressure.

8. A brake comprising a drum, two sets of pairs of pivotally connected arcuate shoes, a control toggle interposed between corresponding certain adjacent ends of the shoes of each set, said toggle comprising an angle lever pivotally connected to corresponding ends of one pair of shoes, a link pivotally connected to the other corresponding ends of the other pair of shoes and also pivotally connected to said angle lever in inwardly offset position relative to said pivotal connection of said angle lever to the shoes, a rocking lever connecting the other end of the angle lever, and control means operatively connected with said rocking lever for actuating the latter to simultaneously uniformly apply the pairs of shoes of both sets against the drum.

9. A brake comprising a drum for connection with a rotary member, an oppositely tapered stationary member extending diametrically within said drum, twin sets of shoes mounted within said drum and arranged side by side to extend across the interior of the drum, each set comprising four segmental arcuate quarter sections with internal webs and arranged in opposed pairs pivotally connected at their adjacent ends by self-adjusting means in the form of links and resiliently held toward each other to conform to the interior of the drum, the other ends of the sections of each set being spaced apart and resiliently held toward each other, a housing at one end of said stationary member and extending between the adjacent spaced-apart ends of two sections of each set of shoes, individually adjustable positioning devices in said housing and respectively engaging the webs of the adjacent ends of each set of shoes for separately adjusting only the spacing of said ends of each set of shoes, a fixed stop on the opposite end of said stationary member between and for abutment by the opposite ends of the other two sections of each set of shoes, and a single control device pivotally mounted on said stationary member and engaging the adjacent ends of said other two sections of each set of shoes on opposite sides of said fixed stop for simultaneously actuating only all of said sets of shoes for causing all of the sections of said twin sets of shoes to uniformly engage and exert braking pressure against the drum.

PIERRE FARKAS.

References Cited in the file of this patent

UNITED STATES PATENTS

| Number | Name | Date |
|---|---|---|
| 864,625 | Douglas | Aug. 27, 1907 |
| 1,076,561 | Duffy | Oct. 21, 1913 |
| 1,078,600 | Marmon | Nov. 11, 1913 |
| 1,124,332 | Rosenberg | Jan. 12, 1915 |
| 1,385,420 | Baker | July 26, 1921 |
| 1,486,611 | Stewart | Mar. 11, 1924 |
| 1,619,239 | Cass et al. | Mar. 1, 1927 |
| 1,860,666 | Evans | May 31, 1932 |
| 2,042,445 | Eksergian | May 26, 1936 |
| 2,196,520 | Butler | Apr. 9, 1940 |
| 2,202,454 | Kaufmann | May 28, 1940 |
| 2,334,692 | Ash | Nov. 23, 1943 |
| 2,575,706 | Farkas | Nov. 20, 1951 |